Oct. 26, 1965 C. C. SIMMONS 3,214,183
AMUSEMENT DEVICE
Original Filed Oct. 6, 1961 3 Sheets-Sheet 3
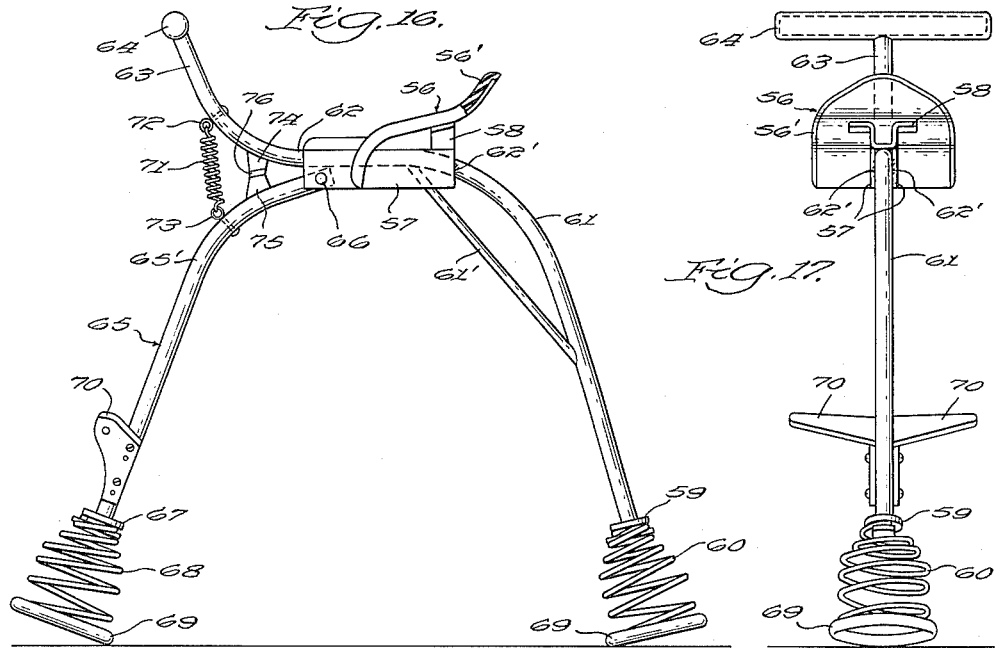
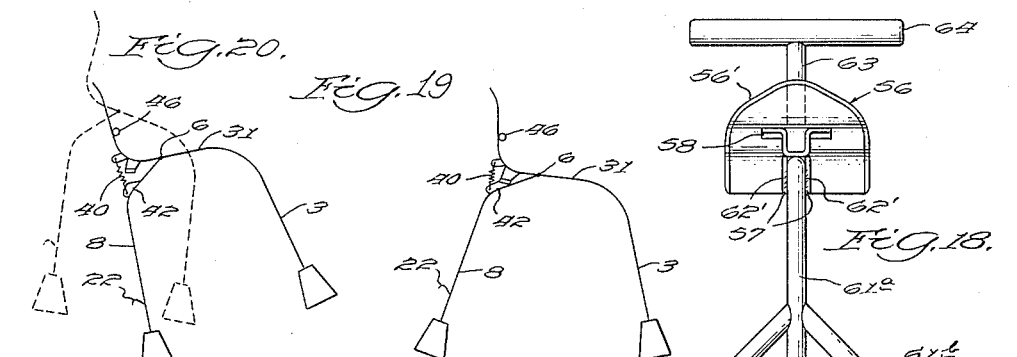
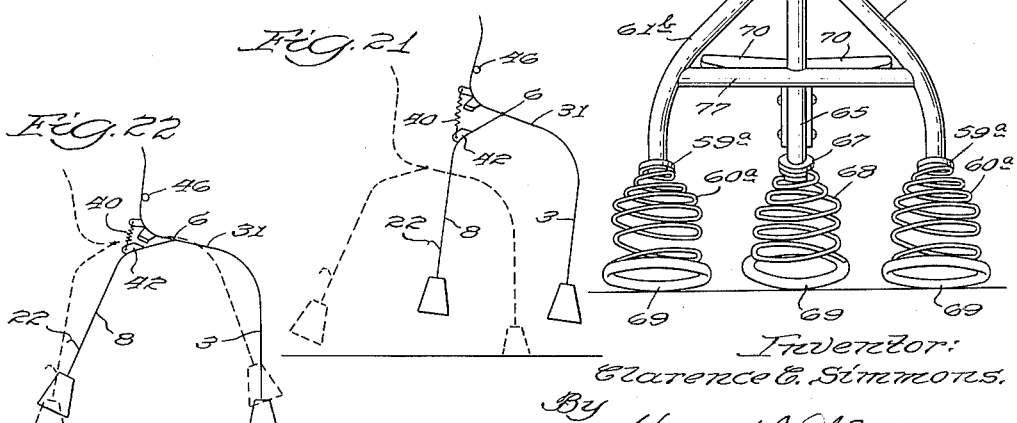
Inventor:
Clarence C. Simmons.
By Harold J. LeVesconte
Atty.

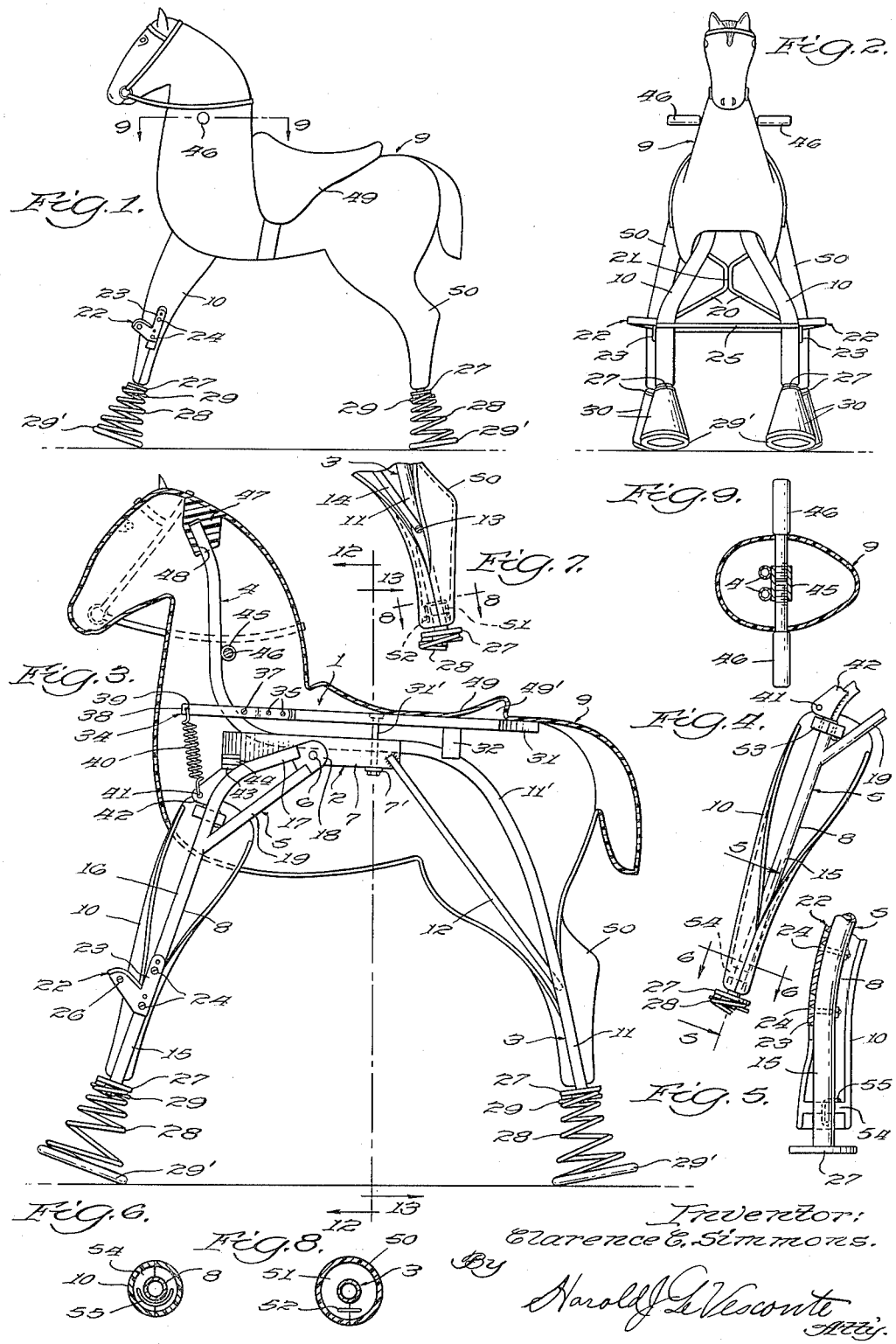

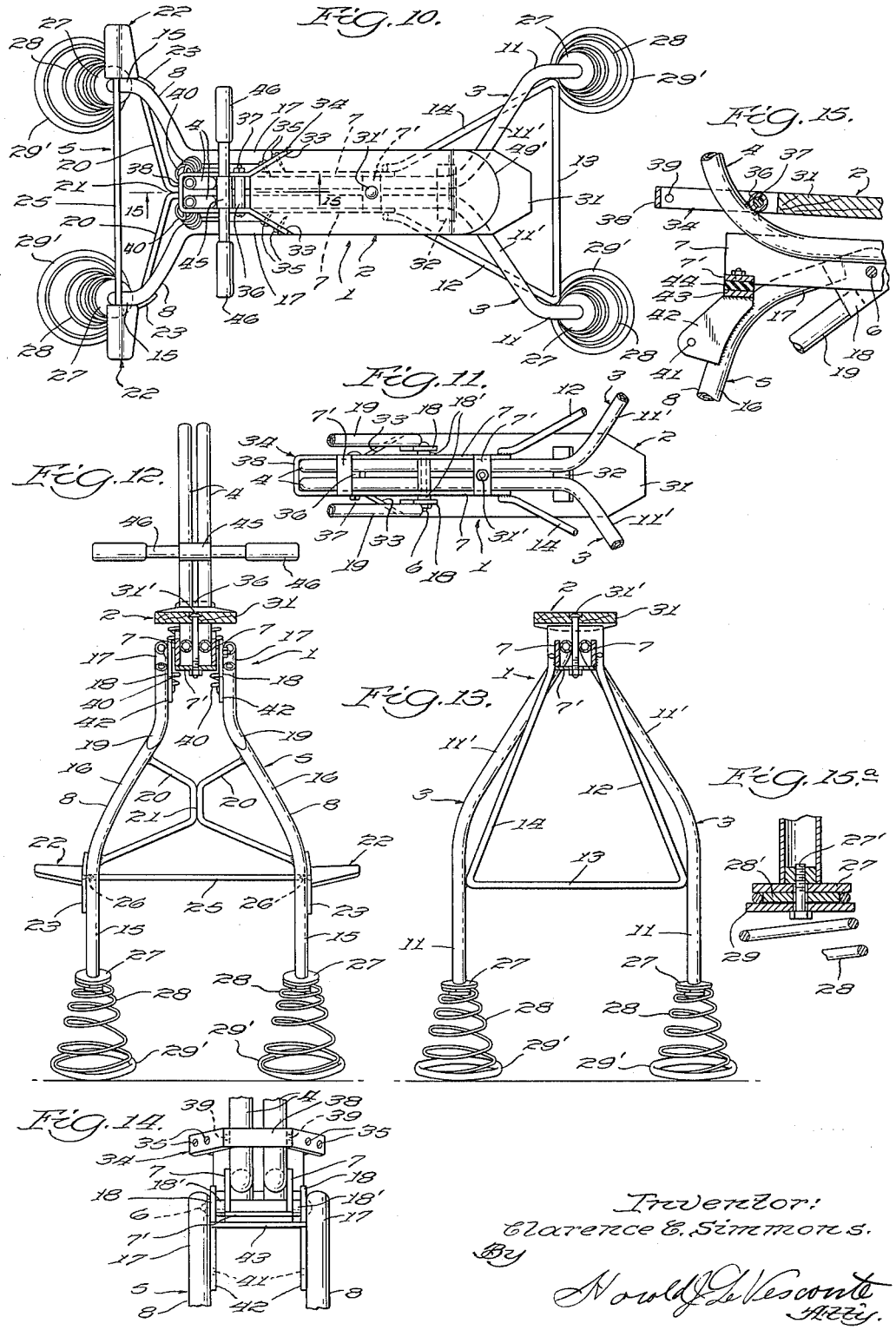

United States Patent Office

3,214,183
Patented Oct. 26, 1965

3,214,183
AMUSEMENT DEVICE
Clarence C. Simmons, 1601 N. Kingsley Drive,
Hollywood, Calif.
Continuation of application Ser. No. 143,430, Oct. 6,
1961. This application Jan. 21, 1964, Ser. No. 340,856
15 Claims. (Cl. 280—1.182)

This application is a continuation of my prior application, Ser. No. 143,430, filed Oct. 6, 1961, and now abandoned.

This invention relates to exercising and amusement means and more particularly to a spring mounted device adapted to be ridden and caused to progress along a floor or the ground in a series of leaps generally comparable to the leaping action of a galloping horse in that the device partakes of unsupported transit generally parallel to the surface of the ground or floor being traversed during a portion of each cycle of operation in said simulation of galloping.

The principal object of the invention is to provide an organized apparatus adapted to be straddled and ridden as a horse is ridden and including relatively movable front leg and rear leg components together with spring means in each of said components adapted to be compressed by the weight of a rider and to assist in the bouncing movements of the rider in operating the apparatus, whereby, during the portion of each cycle of operation, the apparatus is completely clear of the surface being traversed while moving generally parallel to such surface in unsupported transit.

Another object of the invention is to provide a device of the above character adapted to carry a cover means generally simulating the appearance of a horse or other animal to be ridden.

A still further object of the invention is to provide an organized exercise and amusement apparatus adapted to be ridden as a horse is ridden and including a rigid rear leg portion having either one or two foot portions and a single front leg portion having a single foot portion pivotally mounted for swinging movements in the vertical longitudinal plane of the apparatus and operable by the rider in causing the apparatus to progress along a floor, ground or other surface in the previously mentioned manner of a galloping horse.

With the foregoing objects in view, together with such additinal objects and advantages as may subsequently appear, the invention resides in the parts, and in the construction, combination and arrarngement of parts described, by way of example, in the following specification of certain presently preferred embodiments of the invention, reference being had to the accompanying drawings which form a part of said specification and in which drawings:

FIG. 1 is a side elevation of a first embodiment of the invention housed by a cover means simulating a horse, FIG. 2 is a front elevational view of the embodiment shown in FIG. 1, FIG. 3 is an enlarged scale, left side elevational view taken with the covering means broken away at the medial longitudinal vertical plane thereof to disclose the mechanism in side elevation, FIG. 4 is a left hand side elevational view of the right front leg of the first embodiment of the invention with the cover means mounted thereon; the scale being the same as that of FIG. 3, FIGS. 5 and 6 are further enlarged scale, fragmentary views taken, respectively, on the lines 5—5 and 6—6 of FIG. 4, FIG. 7 is a fragmentary left hand side elevational view of the right hand rear leg of the first embodiment of the invention; the view being taken on the same scale as FIG. 3, FIG. 8 is a further enlarged transverse sectional view taken on the line 8—8 of FIG. 7, FIG. 9 is an enlarged scale transverse sectional view taken on the line 9—9 of FIG. 1, FIG. 10 is a top plan view of the device shown in the preceding figures with the cover means removed, FIG. 11 is a fragmentary bottom plan view of the central portion of the device shown in FIG. 10, FIGS. 12 and 13 are medial, transverse sectional views of the device shown in FIG. 10 taken as viewed in the direction of the arrows 12, 12 and 13, 13, respectively, on FIG. 3, FIG. 14 is an enlarged scale, fragmentary, front elevation of the front leg hinging and shock absorbing bumper means, certain tension springs associated therewith being omitted for clarity of illustration, FIG. 15 is an enlarged scale, fragmentary sectional view taken on the line 15—15 of FIG. 10, FIG. 15a, is an enlarged, fragmentary, medial, sectional view shown of the attachment of the foot forming springs to the leg components, FIG. 16 is a side elevational view of a second embodiment of the invention particularly suitable for more skilled riders of the device, FIG. 17 is a rear elevational view of the embodiment shown in FIG. 16, FIG. 18 is a rear elevational view of a variation of the said second embodiment of the invention involving the use of two rear foot springs instead of a single spring and constituting a third embodiment of the invention, FIGS. 19 through 22 are a series of line diagrams showing successive steps or stages in the performance of one cycle of operation of any one of the illustrated embodiments of the invention and particularly showing the novel leaping characteristics of the device. The mode of operation will be described in detail following the description of the structure of the embodiment of the invention shown in FIGS. 1–15.

Referring first to the embodiment of the invention shown in FIGS. 1 to 15, there is illustrated an articulated chassis 1 comprising a back assembly 2 including rigidly associated rear leg members 3, 3 and a rigid neck supporting portion 4. Preferably as will be described in more detail, the said rear leg members and neck supporting portion may be conveniently formed of a pair of light weight metal tubes bent in mirror image relationship. The said chassis portion further includes a front leg assembly 5 pivotally connected at 6 to the base component 7 of the back assembly 2 and includes front leg members 8, 8. In the illustrated embodiment, the back assembly, rear leg members, and neck supporting portions support an enclosing flexible cover 9 formed from rubber or flexible plastic and open at the under side thereof and the outer side surfaces of the front leg assembly is likewise covered by a pair of corresponding rubber or plastic covers 10, 10 the method of mounting these covers to be described in detail as the description of this embodiment of the invention proceeds. While, as shown in FIGS. 1, 2 and 3, the cover elements are shown as simulating a horse, it will be appreciated that, if desired, the cover could be formed in the simulation of some other four-footed animal either actual or fanciful.

The back assembly base component comprises a horizontal pair of flat metal bars 7, 7 having the sides thereof held in parallelism by bottom plates 7′, 7′ welded thereto. The rear leg members 3 each comprise a length of strong, but light weight metal tubing which, as viewed in side elevation extends from the floor as a straight portion 11 upward and slightly diagonally forwardly merging into a curved portion 11′ entering the space between the members 7, 7 and which tubes, as viewed from the rear or front of the device, extend vertically upwardly to about the hock region and thence converge toward the planes of the sides of the member 7, 7 (see FIG. 13) the leg members thence extending forward along the space between the members 7, 7 in parallel relation and thence curving upwardly at about the front ends of the members 7, 7 to form the neck portion 4. The horizontal portions of the tubes are secured by welding or the like to the inner faces of the channel formed by the members 7, 7 and the leg forming portions are reinforced by a brace means comprising a length of metal bar having one end welded to the rear outer face of one of the members 7 and thence extending diagonally downward outwardly and rearwardly in a run 12 which is welded to the right side of the left hand rear leg portion 3. The brace thence extends horizontally laterally in a run 13 to the left of the right rear leg 3 and is welded thereto and thence extends diagonally upwardly inwardly and forwardly in a run 14 having the other end of the brace welded to the outer side face of the other member 7. Obviously, this brace means could be formed from three separate members, if desired.

The front leg elements 8, 8 are similarly formed from strong, light weight metal tubing and are bent in mirror image relation to each other comprising straight lower portions 15, 16, inwardly and upwardly diagonally extending runs 16, 16 which terminate in parallel laterally spaced runs 17, 17 having the ends thereof welded to plates 18, 18 spaced from the sides of the members 7, 7 by collars 18′, 18′ and having holes axially aligned therethrough in which the pivot bolt 6 carried by the members 7, 7 and which bolt also carries the collars 18′, 18′ is received. Preferably, also, the leg members 8, 8 are reinforced by brace members 19, 19 each having one end thereof welded to one each of the respective leg members at the upper ends of the runs 16, 16 thereof and having the other end thereof welded to the plate 18. Lateral stability of the front leg assembly is provided by mirror image brace members 20, 20 each having the ends thereof welded to the respective front leg members at opposite ends of the runs 16, 16 thereof and thence extending convergingly toward each other and meeting in a welded section 21 in the vertical medial plane of the front leg assembly. Each front leg member 8 also carries a footrest element 22 disposed forwardly of the leg member; said footrest element having a vertical flange 23 secured by countersunk screws 24 to the outer face of the leg element at about the upper end of the portions 15 thereof. Lateral stability of the front leg assembly is further assured by a tie rod 25 having its opposite ends internally threaded for engagement by screws 26, 26 extending through said flanges and engaging said threaded ends.

The lower end of each of the front and rear leg forming tubes carry plates 27 each having an axial bore engaged by a threaded bolt 27′ into a nut secured in the lower end of the tube by which the upper, smaller end convolution of a conical coil spring 28 is detachably secured to the under side of the plate by means of a clamp plate 29 engaging the under side of said convolution and through which the bolt 27′ extends to clamp said convolution between the plates 27 and 29. A disc 28′ of less thickness and diameter than said upper coil serves to center the spring relative to the bolt. The lower end of each of the springs terminates in a final convolution which is disposed in a plane normal to the axis of the spring and said final convolution is preferably covered by a length of close fitting tubing of rubber or like material 29′. Also, if desired, these springs may be housed in a flexible, preferably resilient shroud 30 formed of fabric, rubber, or equivalent material as shown in FIG. 2. The strength of these springs is such that under the loads imposed thereon incident to riding the device, the spring means associated with either the front leg means or the rear leg means is not more than partially compressed by the imposition thereon of the momentum deriving from the combined weight of the entire device and that of the rider descending under a condition of free fall from the elevation to which the device has previously been upwardly projected.

In addition to the member 7, 7, the back assembly includes a seat member 31 disposed parallel to and above said members; said seat member having a supporting lug portion 32 depending from the rear end thereof which engages the leg tubes 3, 3 adjacent the upper end of the curved portions 11′, 11′ thereof. A bolt 31′ extends through this seat member downwardly through the rearmost of the cross members 7′ of the member 7 to secure the seat member to the tubes. At its forward end, the member 31 is provided with converging side edges 33, 33 to which the complementary ends of a horizontal, U-shaped bracket 34 are secured by screws 35. The sides of the bracket 34 extend forwardly horizontally from the forward end of the seat member 31 in spaced parallel relation at each side of the end portions 4, 4 of the leg forming tubes 3, 3 and immediately in front of the seat member 31, the tube portions 4, 4 are connected by a transverse spacer collar 36 welded thereto and a transverse bolt 37 extends through both side members of the bracket 34 and the interposed spacer collar 36 to secure the forward end of the seat member to the tubes. The side members of the bracket 34 extend forwardly beyond the tube portions 4, 4 and are conencted by the integrally formed end portions 38. Adjacent to the corners formed by the junctures of said side portions with said end portion, the side portions of the bracket 34 are provided with holes 39, 39 which are engaged by the upper ends of one each of a pair of tension coil springs 40, 40; the other ends of said springs being connected to holes 41, 41 in plates 42, 42 affixed to the upper portions 17, 17 of the front leg elements 8, 8; said springs constantly tending to move the front leg assembly in a clockwise direction about its pivotal mounting 6 as viewed from the left hand side of the device shown in FIG. 3. The springs 40, 40 are of such strength and rate that the unassisted forward movement of the front leg assembly is at a rate which is in harmony with the operative cycle of the device as will be apparent from the description of the mode of operation of the device to be hereinafter described. Affixed to the top edges of the plates 42, 42 and extending horizontally between them is a bumper plate 43 which engages a resilient rubber pad 44 on the bottom surface of the forward cross member 7′ and thus resiliently limits the movement of the leg assembly in that direction. The movement of the leg assembly rearwardly is limited only by engagement with the rear leg assembly. It is particularly to be noted that the location of the pivot 6 on the back assembly and the extent of forward movement of the front leg means permitted by the bumper plate 43 is such that forward movement of the back and rear leg assembly with resultant counterclockwise movement of the front leg assembly, as viewed in FIG. 3, effects a pronounced upward component of movement of that movement up to the point at which the pivot 6 is directly above the surface engaged by the foot spring means associated with the front leg means.

Above the plane of the seat member 31, the tube end portions 4, 4 have an internally threaded sleeve 45 welded thereto and handle elements 46, 46 extending in opposite transverse directions threadedly engage the opposite ends of the threaded sleeve 45.

The cover portion 9 (see FIG. 3) at about the jucture of the top of the head with the neck carries a block of the cover material 47 having holes 48 therein in which the upper ends of the tube portions 4, 4 are received. The handles 46, 46 extend through openings in the neck portion of the cover as shown in FIG. 9 and thus serve to hold the forward end of the cover in position on the ends of the tubes 4, 4. In the illustrated embodiment, the cover exterior is formed to resemble a saddled horse and the saddle simulating portion thereof 49 rests on the top of the seat member 31; the rear portion thereof being supported by a filler block 49' which conforms closely to the configuration thereof. The rear leg portions 50, 50 of the cover are formed integrally with the body and head portions of the cover and the under side of the cover 9 is open as is also the inner or facing sides of the rear leg portions 50, the opening of said leg portions gradually convergingly closing with the edges thereof meeting at a point below the hock as shown in FIG. 7. The lower ends of the rear leg portions of the cover are each formed with an integral, leg encircling collar portion 51 having parallel holes extending through the ends thereof for reception of the parallel limbs of a wire staple 52 by which the collar is clampingly secured about the tube, one of said staple limbs being appreciably longer than the thickness of said collar portion to allow it to be bent over to prevent accidental or unintentional removal of the staple while allowing sufficient endwise movement of the staple to disengage the shorter limb. The front leg cover means comprises a pair of covers 10, 10, one for each leg, which are mirror images of each other, wherefore, a description of one will suffice for both. The front leg cover, like the cover 9 is formed from resilient rubber or plastic and as viewed from the side simulates the external configuration of the foreleg of the animal represented by the cover 9. The side of the cover which faces the opposite cover is, however, open and the edges thereof gradually downwardly converge and finally wrap about the leg portions 15, meeting at a point slightly above the plate 27. The inner face of the cover 10 is provided with integral, leg tube embracing collars 53 and 54 at the upper and lower ends, respectively, and the ends of said collars are releasably secured about the leg tube 8 by staple elements 55 in the same manner as the rear leg portion of the cover is secured by the staples 52. Additionally the outer side of the front leg cover is provided with an opening through which the stirrup member 22 projects.

Next referring to FIGS. 19 through 22, the device is shown in the position of repose or the starting position in FIG. 19. The rider straddles the device and is seated on the seat portion 31, placing his feet on the footrest 22 and grasps the handle portions 46. He then rapidly shifts his weight to the footrest causing the body and back assembly to move about the pivot 6 with the rear leg portion and the seat portion moving forwardly beneath him and partially compressing the forefoot spring means by the momentum deriving from his weight and his rate of change of position as shown in solid lines in FIG. 20. This action is facilitated by the levering action deriving from the weight of the rider on the forwardly projecting footrests; the forefoot spring means being the fulcrum, and by his pressing forwardly on the handles 46. This shift of weight to the footrests serves also to lift the combined body and rear leg portion from the riding surface by movement about the pivot 6, this action being assisted by the yielding opposition deriving from the extension of the springs 40, 40 as the back and rear leg portion is being brought forwardly as shown in solid lines in FIG. 20. When this forward movement progresses to the extent desired by the rider, and while the rear leg portion is still clear of the surface being traversed, he, in effect, jumps upwardly allowing the recoil of the now compressed front foot spring means to cause the entire device to leap clear of the floor as shown in dotted lines in FIG. 20 and in solid lines in FIG. 21. As the rider approaches the top of the upward movement resulting from his jumping action and the recoil of the front foot spring means and while the device is still clear of the surface being traversed, he applies a lifting force to the handles 46 which causes the body and back assembly to swing in a clockwise direction about the pivot 6 for the front leg component and thus tends to bring the seat somewhat downwardly and forwardly beneath him so that as he seats himself again, it is not a matter of shifting his weight rearwardly to do so. The rider then imposes his weight on the seat which, as above explained has been moved forwardly relative to the rider and to the surface being traversed, and pulls back on the handles 46 to cause the full force deriving from the combined weight of himself and the device and the rate of fall to be imposed on the rear foot spring means, compressing the same as shown in dotted lines in FIG. 21 and in solid lines in FIG. 22. As an incident to this portion of the riding cycle, the rider allows the springs 40, 40 to retract with resultant forward movement of the front foot portion of the device about its pivotal mounting. Aided by the recoil of the rear spring means, the rider again moves forward adding the momentum of his weight on the then descending front foot portion as it comes into contact with the surface being traversed and continuing that movement to bring the device to the dotted line position of FIG. 22 which is also the solid line position of FIG. 20 to start the next cycle of movements.

It should be noted that this "galloping" action is achieved at a cyclic rate which is substantially determined by the rates of the various spring means of the device. However, the rider can, to some exetnt, by his own actions as, for example, by the extent of the force developed by him in jumping upwardly while fully supported on the footrests alter the cyclic rate of the device. The main area of control exerted by the rider on the device is, however, in the speed or rate of travel deriving principally from the increments of movement of the front leg assembly as it leaves the surface, swings forward, and then contacts the surface being traversed, it being understood that the greater the downward force exerted on the front foot spring means by the jumping action of the rider, the greater the recoil of that spring means and the greater the time element for the front leg assembly to be swung forward by the springs 40, 40. It naturally follows that this increased upward propulsion by the recoil of the front foot spring means correspondingly increases the extent of free fall of the device and rider on the rear foot spring means with resultant greater compression and recoil of the rear foot spring means. In other words, the speed of travel of the device bears a direct relation to the energy thus expanded by the rider. It is important to note that in all of these actions, the movement of the rider relative to the surface being traversed is forward and he at no time is required to rock back and forth to impart forward movement to the device.

In order to achieve a "galloping" gait to the device involving a period of unsupported forward transit in each cycle of operation, it is obviously necessary that the spring means associated with the foot portions of the device have a strength to project the device and rider upwardly at a rate which is in excess of the rate of freely falling bodies, or 32'/sec./sec. It is for this reason that the device is constructed so that the rider can quickly, and without moving rearwardly relative to the surface traversed, impose his entire weight and that of the device alternately on the front foot spring means and the rear foot spring means and that when this is done, these spring means are of such strength as to be only partially compressed and to have sufficient recoil force thus stored in the springs to achieve the necessary upward acceleration. This enables the device to progress with a realistic galloping action which is much like that of a real horse.

Turns are made by twisting the device with the aid of the handles 46 around a vertical axis during a series of leaps, the turns being completed while the device is free of the riding surface, or alternatively, by causing the device to leap at the front end only and causing the front end of the device to move laterally by lateral force imposed by the rider on the handles.

Alternatively, the "leaping" characteristics of the operation can be dispensed with at the option of the rider and the progression be one which resembles a walking gait.

An expert rider can cause the device to progress in leaps that are of greater length than the distance through which the surface contacting portion of the front leg means may be moved about the pivotal mounting thereof, and with further experience, can actually cause the device to partake of unsupported transit rearwardly; these capacities being the result of careful coordination of his actions with the spring responses of the device to those actions.

Referring next to FIGS. 16 and 17 there is shown a second embodiment of the invention which is simplified and intended for more skilled riders than the first embodiment. In general this embodiment differs from the first embodiment only in that the cover means is eliminated and in that only one foreleg and one rear leg is provided. Incidentally, it may be noted at this point that the first embodiment of the invention can be ridden and used without the cover means which is purely for ornamentation.

Specifically, this embodiment of the invention comprises a light weight sheet metal seat or saddle portion 56 preferably having the upper surface thereof provided with suitable padding 56' carrying welded or otherwise united side plates 57, 57 extending longitudinally thereof and having bracket portions 58, 58 which support the rear portion of the seat. The rear leg component is formed from a length of tubing bent into a modified S-shaped which is provided at one end thereof with a plate 59 and a foot forming volute compression spring 60 carried thereby and secured thereto in the same manner as the springs 28 and the tubing extends upwardly in a curve 61 reinforced by a brace 61' welded thereto and extending across said curved portion into a horizontal run 62 disposed between the plates 57, 57 to which it is welded as at 62', 62'. The tube thence extends in a curved portion 63 upwardly and forwardly to carry a transverse handle 64.

The front leg component 65 is formed from a length of tubing having its upper end disposed between and pivotally mounted on the plates 57, 57 by a transversely disposed pivot pin 66 and the tube thence extends in a curve 65' to a depending straight portion which at its lower end carries a plate 67 on which a similar volute foot forming spring 68 is mounted and secured in the same manner as previously described foot forming spring. Preferably, the springs 60 and 68 terminate in square ended convolutions covered with rubber or plastic tubing 69. Immediately above the plate 67, the said front leg portion is provided with oppositely extending forwardly projecting footrests 70, 70. A tension spring 71 has one end secured to an eye 72 carried by the tube portion 63 below the handle 64 and the other end of said spring is secured to an eye 73 carried by the curved upper end of the front leg component 65. Interengaging stop members 74 and 75 with an interposed resilient pad 76 are carried, respectively, by the tube portions 63 and the leg component 65 in rear of the spring 71. The use and the operation of the device is the same as described in connection with the first embodiment it being noted that since there is only a single front leg and a single rear leg provided, greater skill is required on the part of the rider to continue to progress with the device without losing balance. This construction, however, permits greater latitude of display of skill for the accomplished rider.

Referring to FIG. 18, there is shown a variation of the second embodiment in which the single foot of the rear leg portion is supplanted by a pair of foot elements on said leg portion. For this purpose, the rear leg forming tube 61a terminates short of the point at which the foot forming springs are attached and carries a transversely extending brace 77. The foot forming plates 59a, 59a and spring 60a, 60a are mounted on the ends of laterally downwardly extending tube portions 61b, 61b which are welded to the sides of the tube 61a above the brace 77, and to the adjacent ends of the brace 77. The two foot springs 60a, 60a are, of course, of such strength that their combined resistance is equal to the single spring 60. This provides some greater stability than the second embodiment of the invention while being simpler in construction and cheaper to manufacture and sell than the first embodiment of the invention.

The outstanding characteristic of the present invention is the employment of an organized mechanism which, in operation, effects a true running or galloping action including in each cycle of movements a period of unsupported transit as distinguished from a walking or stepping gait in which there is constant contact with the surface being traversed. This includes the principle of what will be designated as cumulative acceleration. This term is here employed to designate in the forward progress of the present device the characteristic which is similar to the locomotion or other forward progress of animals and birds involving repeated cycles of movement and in which a portion of the inertia of each cycle of forward movement is imparted to and employed in the next succeeding cycle of such movement. Similarly, in the present device, a portion of the inertia in each leap is utilized in the next succeeding leap up to the point of maximum effort expended by the rider.

Thus there has been provided an exercise and amusement apparatus which can be ridden as a horse is ridden and caused to progress by the efforts of the rider in a series of leaps or bounds comparable to the action of a galloping horse or in an action not involving leaping completely clear of the surface being traversed and which is roughly comparable to that of a walking horse. Additionally, it provides a means for increasing the skill of the rider and at the same time provides adequate exercise for both children and adults.

While the foregoing specification has disclosed certain presently preferred embodiments and modifications of the invention, it will be appreciated that such disclosure has been by way of example and that the said disclosure is not to be deemed to limit the invention to the precise details of construction thus disclosed, wherefore it will be understood that the invention includes, as well, all of such changes and modifications in the parts and in the construction, combination and arrangement of parts as shall come within the purview of the appended claims.

I claim:

1. An amusement device adapted to be ridden in the manner of riding a horse; said device including a chassis structure comprising a body and back assembly including a seat portion for the rider, a forwardly disposed handle means rigidly fixed to said body and back assembly and positioned for convenient grasping by a rider seated on said seat portion and a rear leg means rigidly attached to and depending from said body and back assembly, a front leg means pivotally connected to said body and back assembly for pivotal movement about a horizontal axis extending transversely of said body and back assembly, a footrest means on said front leg means, spring means extending between said front leg means and said body and back assembly constantly operative to tend to move said front leg means on said pivotal connection in a direction to move the lower end of said front leg means forwardly, a spring means incorporated in the structure of the lower portion of said front leg means, another spring means incorporated in the structure of the lower portion of said rear leg means, said handle means and said footrest means enabling a rider, incident to normal use of the device, to impose his full weight alternately on said front leg means and on said rear leg means and each of said spring means incorporated in said front and rear leg means having a strength such that the combined weight of the rider and said device thereon will effect partial compression only of said one or the other of said incorporated spring means.

2. An amusement device as claimed in claim 1 in which said spring means associated with each of said leg means comprises compressible coil springs each having at least the upper ends thereof formed as a cone with the smaller end of said cone fixed to the distal end portion of the respective leg means and having the lower ends thereof adapted to contact the surface over which the device is caused to travel.

3. An amusement device as claimed in claim 1 in which said chassis includes a rigidly forwardly disposed, substantially vertical member rising from said back assembly and on which said handle means is mounted.

4. An amusement device as claimed in claim 1 in which one of said leg means includes a pair of ground engaging foot elements and in which the other of said leg means includes a single ground engaging foot element.

5. An amusement device as claimed in claim 1 in which said rear leg means comprises a pair of leg elements disposed in fixed side-by-side relation and in which said front leg means similarly comprises a pair of front leg elements connected in fixed side-by-side relation to move about said pivotal mounting in unison.

6. An amusement device as claimed in claim 5 in which said spring means associated with each of said front and rear leg elements comprises a compressible coil spring having at least the upper end portion thereof formed as a cone with the smaller end thereof fixed to the distal end of the leg element with which it is associated and having the lower end thereof adapted to contact the surface over which the device is caused to travel.

7. An amusement device as claimed in claim 5 in which one each of a pair of footrest means is carried by one each of said front leg elements and in which said foot rest means are disposed forwardly and laterally outwardly from the associated leg elements.

8. An amusement device as claimed in claim 1 in which said spring means associated with said front leg means has a rate of recoil sufficient to propel the rider and the device as a unit clear of the surface being traversed, in which said body and back assembly includes a stop means to limit the extent of forward pivotal movement of said front leg means, and in which said spring means extending between said body and back assembly and said front leg means has a strength and rate sufficient to move said front leg means forwardly to the extent permitted by said stop means whenever said front leg means shall be out of contact with the surface being traversed in the said normal use of the device.

9. An amusement device as claimed in claim 1 in which said spring means incorporated in said front leg means has a capacity for recoil sufficient to propel the rider and the device as a unit completely clear of the surface being traversed.

10. An amusement device as claimed in claim 1 in which said spring means incorporated in said rear leg means has a strength sufficient to be only partially compressed by the weight of the device and the rider as a unit in free fall from the elevation to which such unit has been propelled as an incident to the recoil of said front spring means.

11. An amusement device as claimed in claim 2 in which said coil springs, additionally, have capacity to resiliently yield laterally of the axis of the coils thereof to accommodate angular relation of the leg means on which the spring is carried with respect to the surface being traversed.

12. An amusement device adapted to be ridden in the manner of riding a horse; said device including a chassis structure comprising a body and back assembly including a seat portion for the rider, a forwardly disposed handle means rigidly fixed to said body and back assembly and positioned for convenient grasping by a rider seated on said seat portion, a rear leg means rigidly attached to said body and back assembly and including a single surface engaging foot portion, a front leg means pivotally connected to said body and back assembly for movement about a horizontal axis extending transverely of said chassis and including a single surface engaging foot portion, a footrest means on said front leg means, spring means extending between said front leg means and said body and back assembly constantly operative to tend to move said front leg means on said pivotal mounting in a direction to move the lower end of said front leg means forwardly, a first spring means incorporated in the lower portion of said front leg means and another spring means incorporated in the lower portion of said rear leg means; said handle means and said footrest means enabling a rider momentarily to impose his full weight and that of said device alternately on said front leg means and on said rear leg means; each of said spring means incorporated in said front and rear leg means individually having a strength such that the combined weight of a rider and said device thereon will effect partial compression only thereof.

13. An amusement device as claimed in claim 12 in which said back assembly includes a forwardly disposed substantially vertical member rising from said back assembly; said vertical member carrying said handle means and in which said foot rest means for the feet of the rider is disposed forwardly and laterally outwardly of each side of said front leg means.

14. An amusement device adapted to be ridden in the manner of riding a horse; said device including a chassis structure comprising a body and back assembly including a seat portion for the rider, a forwardly disposed handle means carried by said body and back assembly and positioned for convenient grasping by a rider seated on said seat portion and a rear leg means rigidly attached to and depending from said body and back assembly, a front leg means pivotally connected to said body and back assembly for pivotal movement about a horizontal axis extending transversely of said body and back assembly, spring means extending between said front leg means and said body and back assembly constantly operative to tend to move said front leg means on said pivotal connection in a direction to move the lower end of said front leg means forwardly, a spring means incorporated in the structure of the lower portion of said front leg means, a foot rest means disposed in such structural adjacency to said last-named spring means that a rider seated on said seat portion may momentarily rise from said seat portion and impose at least his full weight on said foot rest means with resultant compression of said adjacent spring means, another spring means incorporated in the structure of the lower portion of said rear leg means, said handle means and said foot rest means enabling a rider, incident to normal use of the device, to impose his full weight alternately on said front leg means and on said rear leg means; and each of said spring means incorporated in said front leg means and said rear leg means having a strength such that the combined weight of the rider and said device thereon will effect partial compression only of said one or the other of said spring means incorporated in said front leg means and said rear leg means.

15. An amusement device as claimed in claim 14 in which said handle means is so positioned vertically with respect to said foot rest means that the rider while imposing his full weight on said foot rest means may employ said handle means to move said body and back assembly forwardly beneath him preparatory to the imposition of his weight on said spring means incorporated in said rear leg means at a point of progress forward of the last preceding point at which his weight was so imposed.

References Cited by the Examiner

UNITED STATES PATENTS

| | | | |
|---|---|---|---|
| 1,553,219 | 9/25 | Crosby | 280—1.183 X |
| 2,793,044 | 5/57 | Bottemiller | 280—1.13 |
| 2,960,345 | 11/60 | Chontos | 280—1.182 |

FOREIGN PATENTS

| | | |
|---|---|---|
| 206,679 | 11/23 | Great Britain. |
| 410,664 | 3/25 | Germany. |
| 576,754 | 5/24 | France. |
| 833,772 | 3/52 | Germany. |

A. HARRY LEVY, *Primary Examiner.*

LEO FRIAGLIA, *Examiner.*

UNITED STATES PATENT OFFICE
CERTIFICATE OF CORRECTION

Patent No. 3,214,183             October 26, 1965

Clarence C. Simmons

It is hereby certified that error appears in the above numbered patent requiring correction and that the said Letters Patent should read as corrected below.

Column 5, line 50, for "stirrup" read -- footrest --; column 9, line 20, after "rigidly" insert -- incorporated, --.

Signed and sealed this 9th day of August 1966.

(SEAL)
Attest:

ERNEST W. SWIDER
Attesting Officer

EDWARD J. BRENNER
Commissioner of Patents